United States Patent
Tucker et al.

(10) Patent No.: US 9,068,469 B2
(45) Date of Patent: Jun. 30, 2015

(54) GAS TURBINE ENGINES WITH ABRADABLE TURBINE SEAL ASSEMBLIES

(75) Inventors: Bradley Reed Tucker, Chandler, AZ (US); Jason Smoke, Phoenix, AZ (US); Mark C. Morris, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 806 days.

(21) Appl. No.: 13/224,035

(22) Filed: Sep. 1, 2011

(65) Prior Publication Data

US 2013/0058768 A1 Mar. 7, 2013

(51) Int. Cl.
*F01D 11/12* (2006.01)
*F01D 11/00* (2006.01)

(52) U.S. Cl.
CPC .......... *F01D 11/122* (2013.01); *Y10T 29/49297* (2015.01); *F01D 11/006* (2013.01); *F05D 2240/55* (2013.01); *F05D 2230/313* (2013.01); *F05D 2300/123* (2013.01)

(58) Field of Classification Search
CPC ..... F01D 11/00; F01D 11/001; F01D 11/008; F01D 11/04; F01D 11/12; F01D 11/122; F01D 11/127; F01D 11/18; F01D 5/081
USPC .................. 415/1, 116, 134, 136, 138, 173.1, 415/173.4, 173.5, 173.7, 174.4, 191, 199.5, 415/211.2; 416/193 A; 277/411, 415, 924
See application file for complete search history.

(56) References Cited

U.S. PATENT DOCUMENTS

| | | | |
|---|---|---|---|
| 5,352,087 A * | 10/1994 | Antonellis | 415/115 |
| 5,967,745 A | 10/1999 | Tomita et al. | |
| 6,189,891 B1 | 2/2001 | Tomita et al. | |
| 6,190,124 B1 * | 2/2001 | Freling et al. | 415/173.4 |
| 6,887,039 B2 | 5/2005 | Soechting et al. | |
| 7,044,710 B2 | 5/2006 | Naik et al. | |
| 7,500,824 B2 | 3/2009 | Cheng et al. | |
| 2001/0016163 A1 * | 8/2001 | Tomita et al. | 416/193 A |
| 2008/0061515 A1 | 3/2008 | Durocher et al. | |
| 2009/0110548 A1 * | 4/2009 | Durocher et al. | 415/173.4 |
| 2010/0074734 A1 | 3/2010 | Little | |
| 2010/0254806 A1 | 10/2010 | Deodhar et al. | |

* cited by examiner

*Primary Examiner* — Edward Look
*Assistant Examiner* — Christopher J Hargitt
(74) *Attorney, Agent, or Firm* — Ingrassia Fisher & Lorenz, P.C.

(57) ABSTRACT

A turbine section of a gas turbine engine includes a housing, a rotor assembly, and a seal assembly. The rotor assembly includes a rotor disk, a rotor platform coupled to the rotor disk, and a rotor blade extending from the rotor platform into the mainstream hot gas flow path. The stator assembly includes a stator platform with a stator vane that extends from the stator platform into the mainstream hot gas flow path. The seal assembly includes a first flow discourager extending in a first direction from the rotor platform, a second flow discourager extending in a second direction from the stator platform, the first flow discourager axially overlapping the second flow discourager such that the second flow discourager is interior to the first flow discourager in a radial direction, a hard coating applied to the first flow discourager, and an abradable coating applied to the second flow discourager.

18 Claims, 4 Drawing Sheets

US 9,068,469 B2

GAS TURBINE ENGINES WITH ABRADABLE TURBINE SEAL ASSEMBLIES

STATEMENT REGARDING FEDERALLY SPONSORED RESEARCH OR DEVELOPMENT

This invention was made with Government support under W911W6-08-2-0001 awarded by the United States Army. The Government has certain rights in this invention.

TECHNICAL FIELD

The present invention generally relates to gas turbine engines, and more particularly relates to seal assemblies used in the turbines of gas turbine engines to prevent or mitigate hot gas ingestion.

BACKGROUND

A gas turbine engine may be used to power various types of vehicles and systems, such as aircraft engines and auxiliary power units in aircraft. In a typical configuration, the turbines of such engines include rows of stator vanes and rotor blades disposed in an alternating sequence along the axial length of a generally annular hot gas flow path. The rotor blades are mounted at the periphery of one or more rotor disks mounted on a main engine shaft. Hot combustion gases are delivered from an engine combustor to the annular hot gas flow path, thus resulting in rotary driving of the rotor disks and main engine shaft to provide an engine output.

In most gas turbine engine applications, it is desirable to regulate the operating temperature of the engine components in order to prevent overheating and potential mechanical failures attributable thereto. Temperature control of gas turbine engines is complicated by hot gas leaking through gaps in the mainstream flow path, particularly in the areas between the rotating rotor assemblies and the stationary stator assemblies. While the engine stator vanes and rotor blades are specially designed to function in the high temperature environment of the mainstream hot gas flow path, other engine components, such as the rotor disks, are generally not designed to withstand such temperatures. Accordingly, in many gas turbine engines, the volumetric space disposed radially inward to the hot gas flow path may be cooled by air flow bled from a compressor of the gas turbine engine. The cooling of internal engine cavities attempts to maintain the temperatures of rotor disks and other internal engine components at levels that are suitable for their material and stress level.

In many conventional engines, relatively high cooling air flows have been used to obtain satisfactory temperature control of engine components within the cooled internal engine cavity. However, any air used for cooling is not available for use to produce mechanical energy, thus reducing the efficiency of the engine. Additionally, such cooling schemes are complicated by the relatively irregular and unpredictable ingestion of mainstream hot gases from the hot gas flow path into the internal engine cavity. Various attempts to prevent hot gas ingestion between adjacent stator vanes and rotor blades have been proposed, including baffles, flow discouragers, and pocket structures. In the past, these techniques have not been completely effective, or have otherwise required structures of complex shape and/or mounting arrangements at the time of initial engine production.

Accordingly, it is desirable to provide an improved gas turbine engine that reduces or eliminates hot gas ingestion into the internal cavities within the turbine. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a turbine section of a gas turbine engine includes a housing, a rotor assembly, and a seal assembly. The housing includes an annular duct wall that at least partially defines a mainstream hot gas flow path configured to receive mainstream hot gas flow. The rotor assembly includes a rotor disk, a rotor platform coupled to the rotor disk, and a rotor blade extending from the rotor platform into the mainstream hot gas flow path. The stator assembly is positioned adjacent to the rotor assembly and forms a turbine disk cavity with the rotor disk of the rotor assembly. The stator assembly includes a stator platform with stator vane that extends from the stator platform into the mainstream hot gas flow path. The seal assembly includes a first flow discourager extending in a first direction from the rotor platform, a second flow discourager extending in a second direction from the stator platform, the first flow discourager axially overlapping the second flow discourager such that the second flow discourager is interior to the first flow discourager in a radial direction, a hard coating applied to the first flow discourager, and an abradable coating applied to the second flow discourager.

In accordance with another exemplary embodiment, a seal assembly is provided for a turbine section of a gas turbine engine, the turbine section including a stator assembly with a stator platform and a rotor assembly with a rotor platform. The seal assembly includes a first flow discourager extending in a first direction from the rotor platform; a second flow discourager extending in a second direction from the stator platform, the first flow discourager axially overlapping the second flow discourager such that the first flow discourager is interior to the second flow discourager in a radial direction; a hard coating applied to the second flow discourager; and an abradable coating applied to the first flow discourager.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein are directed to gas turbine engines with a turbine section having alternating rows of rotor assemblies and stator assemblies. Turbine seal assemblies may be provided to prevent or mitigate hot gas ingestion of mainstream gas flow through gaps between rotor and stator assemblies and into internal disk cavities. The seal assemblies may include a rotor discourager extending from a rotor platform that overlaps a stator discourager extending from a stator platform. It is generally advantageous to maintain a minimum running clearance between the discouragers during normal operating conditions to reduce or eliminate hot gas ingestion, although there are some operating conditions during which the discouragers may rub together. To accommodate these various conditions, the seal assemblies may include a hard coating applied to the radially inward facing side of the rotor discourager and an abradable coating applied to the radially outward facing side of the stator discourager. The hard coating and abradable coating cooperate to prevent damage in the event of contact between the discouragers, while enabling the minimized running clearance to address hot gas ingestion.

Figure 1:
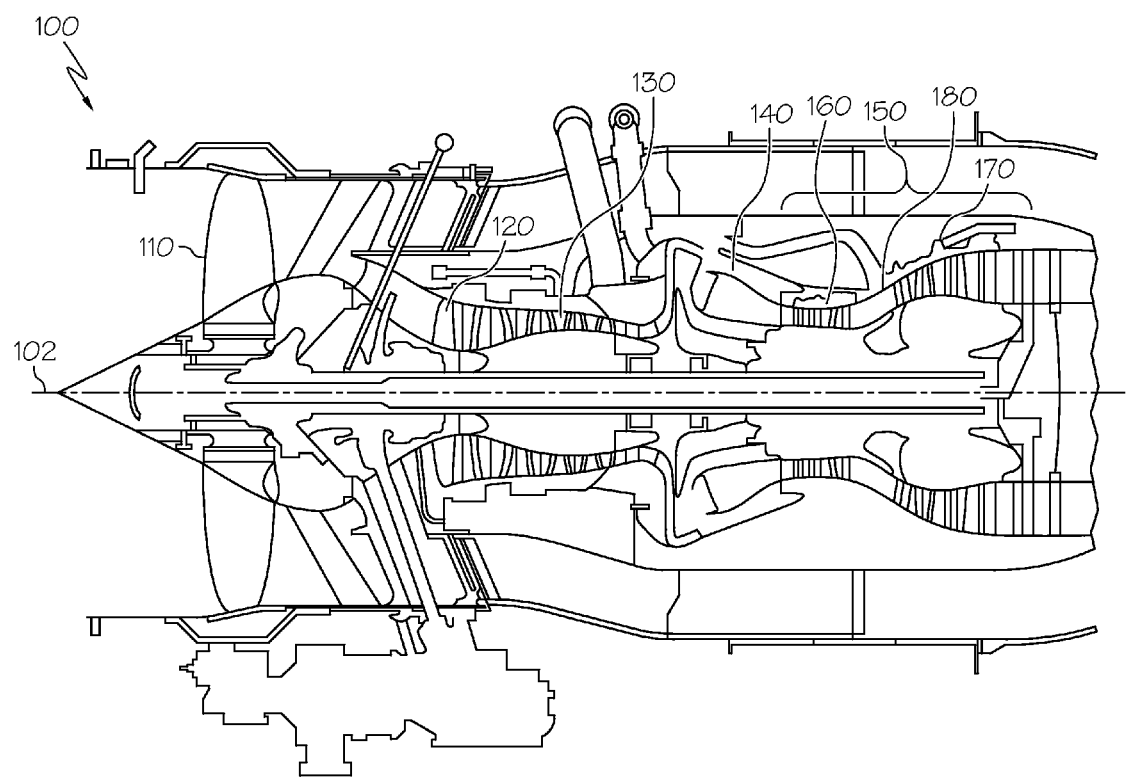
FIG. 1 is a schematic cross-sectional view of a gas turbine engine in accordance with an exemplary embodiment.

FIG. 1 is a schematic cross-sectional view of a gas turbine engine 100 in accordance with an exemplary embodiment. As shown, the engine 100 may be an annular structure about a longitudinal or axial centerline axis 102. In the description that follows, the term "axial" refers broadly to a direction parallel to the axis 102 about which the rotating components of the engine 100 rotate. This axis 102 runs from the front of the engine 100 to the back of the engine 100. The term "radial" refers broadly to a direction that is perpendicular to the axis 102 and that points towards or away from the axis of the engine 100. A "circumferential" direction at a given point is a direction that is normal to the local radial direction and normal to the axial direction. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

The engine 100 generally includes, in serial flow communication, a fan section 110, a low pressure compressor 120, a high pressure compressor 130, a combustor 140, and one or more turbines 150, such as a high pressure turbine 160 and a low pressure turbine 170. During operation, ambient air enters the engine 100 at the fan section 110, which directs the air into the compressors 120 and 130. The compressors 120 and 130 provide compressed air to the combustor 140 in which the compressed air is mixed with fuel and ignited to generate hot combustion gases. The compressors 120 and 130 may also provide cooling air to other portions of the engine 100. The combustion gases from the combustor 140 pass through the high pressure turbine 160 and the low pressure turbine 170 via an inter-turbine duct 180.

The high pressure turbine 160 and low pressure turbine 170 are used to provide thrust via the expulsion of the exhaust gases, to provide mechanical power by rotating a shaft connected to one of the turbines 160 and 170, or to provide a combination of thrust and mechanical power. As one embodiment, the engine 100 is a multi-spool engine in which the high pressure turbine 160 drives the high pressure compressor 130 and the low pressure turbine 170 drives the low pressure compressor 120 and fan section 110. In other embodiments, additional or fewer turbines, or different configurations, may be provided.

Figure 2:
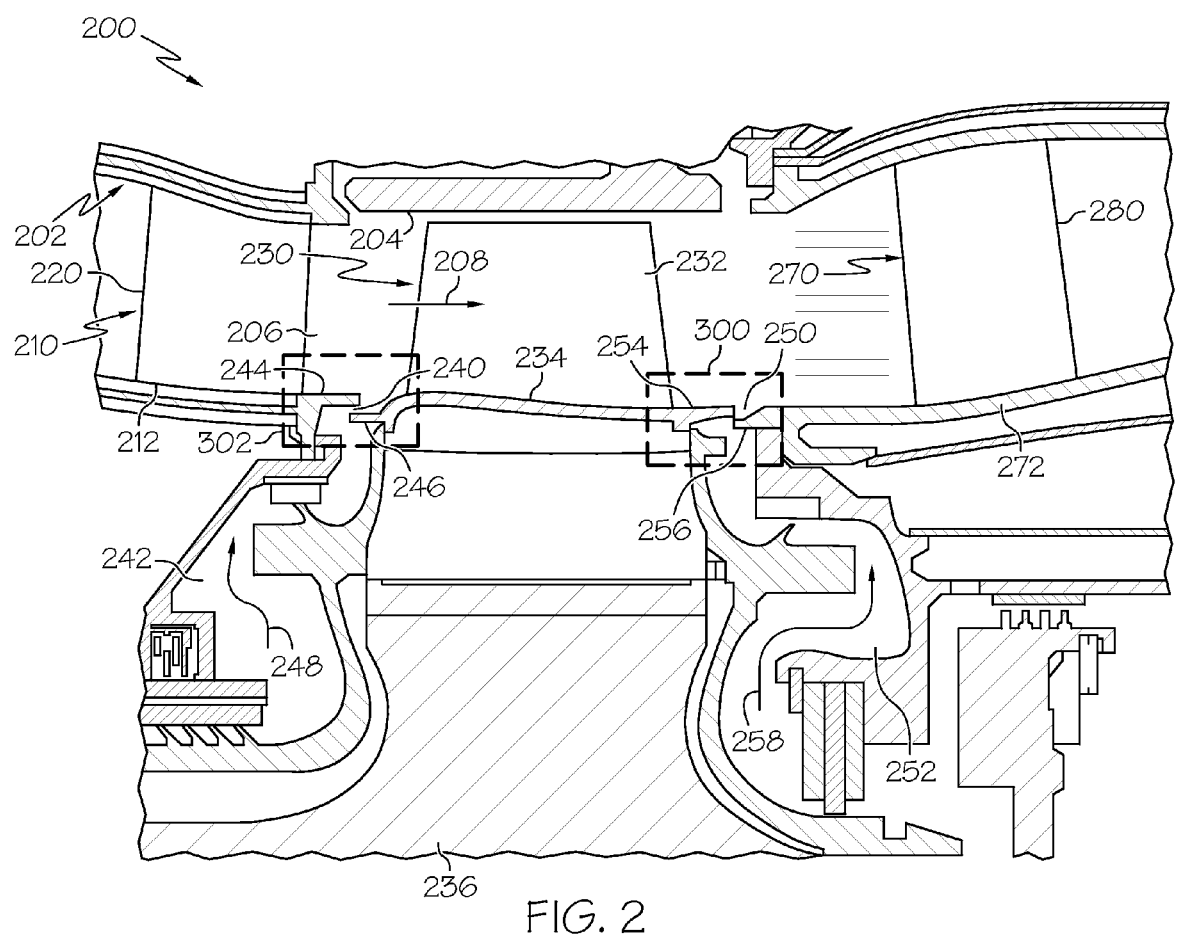
FIG. 2 is a partial, cross-sectional view of a turbine section of the gas turbine engine of FIG. 1 in accordance with an exemplary embodiment.

FIG. 2 is a partial cross-sectional view of a turbine section 200 of the gas turbine engine 100 of FIG. 1 in accordance with an exemplary embodiment. With reference to FIG. 1, the turbine section 200 may be part of the high pressure turbine 160 or low pressure turbine 170.

The turbine section 200 has an overall construction and operation that is generally known and understood by persons skilled in the art. In general terms, the turbine section 200 has a housing 202 with an annular duct wall or shroud 204 that partially defines a mainstream hot gas flow path 206 for receiving a flow of mainstream combustion gases 208 from an engine combustor (not shown). The housing 202 additionally houses at least one stator assembly 210 and 270 and at least one rotor assembly 230. In the partial view of FIG. 2, two stator assemblies 210 and 270 and one rotor assembly 230 are shown in an alternating pattern. Each of the stator assemblies 210 and 270 includes a circumferential row of stator vanes 220 and 280 (one of which is shown for each assembly) extending between a stator platform 212 and 272 and the duct wall 204. The rotor assembly 230 includes a circumferential row of rotor blades 232 (one of which is shown) that project radially outward from a turbine rotor platform 234. The rotor platform 234 is coupled to a rotor disk 236, which in turn circumscribes a shaft (not shown). As such, the rotor blades 232, rotor platform 234, and rotor disk 236 are coupled together and rotate with the shaft (not shown). Although only one rotor assembly 230 and two stator assemblies 210 and 270 are shown, additional rotor and stator assemblies may be provided.

During operation, the mainstream gases 208 flow past axially spaced circumferential rows of stator vanes 220 and 280 and rotor blades 232. Particularly, the mainstream gases 208 drive the rotor blades 232 and the associated rotor assembly 230 for power extraction. Other embodiments may be differently arranged.

As shown in FIG. 2, the mainstream flow path 206 is defined on one side by the duct wall 204 and on the other side by the stator platform 212, rotor platform 234, and stator platform 272. The mainstream flow path 206 is at least partially interrupted by gaps 240 and 250 between the platforms 212, 234, and 272. For example, a first gap 240 between the stator platform 212 and the rotor platform 234 separates the rotating rotor assembly 230 from the stationary stator assembly 210. A second gap 250 between the rotor platform 234 and the stator platform 272 separates the rotating rotor assembly 230 from the stationary stator assembly 270. Rotor disk cavities 242 and 252 are respectively formed on either side of rotor disk 236, radially interior to the gaps 240 and 250.

At times, a portion of the mainstream gases 208 may attempt to flow through the gaps 240 and 250 as ingested gas. Particularly, pressure gradients may occur along the mainstream flow path 206 and contribute to such ingestion. The elevated temperatures of the mainstream gases 208 may adversely affect certain components in the disk cavities 242 and 252. As such, it is generally advantageous to prevent or mitigate hot gas ingestion through the gaps 240 and 250 and into the disk cavities 242 and 252.

Various mechanisms may be provided in an attempt to mitigate or prevent hot gas ingestion through the gaps 240 and 250. For example, purge air 248 and 258 may be introduced into the disk cavities 242 and 252 to cool the disk cavities 242 and 252. The purge air 248 and 258 may also provide a pressure balance to counteract the flow of mainstream gas 208 through the gaps 240 and 250. However, purge air 248 and 258 is typically bled from the compressor (e.g., compressor 120 or 130) of the engine 100 (FIG. 1), and minimization of the purge air 248 and 258 is generally advantageous.

Additionally, seal assemblies 300 and 302 may be provided at the gaps 240 and 250 to divert or otherwise prevent or reduce mainstream gases 208 from entering the gaps 240 and 250. Particularly, the seal assemblies 300 and 302 encourage the mainstream gases 208 to maintain an axial direction through the mainstream flow path 206. The seal assemblies 300 and 302 may be axi-symmetric and annularly extend about the axis 102 (FIG. 1). The seal assemblies 300 and 302 will be introduced prior to a more detailed description of the seal assembly 300 shown in FIGS. 3 and 4.

In one exemplary embodiment, the seal assembly 302 includes a downstream stator discourager 244 and an upstream rotor discourager 246 that define the gap 240. Particularly, the downstream stator discourager 244 extends axially from the stator platform 212 and the upstream rotor discourager 246 extends axially from the rotor platform 234 to axially overlap one another with the downstream stator discourager 244 located radially outward from the upstream rotor discourager 246. In this context, the term axially overlap refers to a coincidence of the structures along an axial direction, e.g., overlapping when viewed in a radial direction to the axis. The overlapping nature of the downstream stator discourager 244 and the upstream rotor discourager 246 encourage a smoother flow for the mainstream gases 208 along the mainstream flow path 206 to discourage hot gas ingestion from flowing in a radial direction through the gap 240. Typically, the discouragers 244 and 246 are integral with the respective platform 212 and 234, although other arrangements may be provided.

The seal assembly 300 includes a downstream rotor discourager 254 and an upstream stator discourager 256 that define the gap 250. The downstream rotor discourager 254 extends axially from the rotor platform 234 and the upstream stator discourager 256 extends axially from the stator platform 272 to axially overlap one another with the downstream rotor discourager 254 located radially outward from the upstream stator discourager 256. Each of the discouragers 254 and 256 extends partially across the space between the platforms 234 and 272 and terminate at a free end. The overlapping nature of the downstream rotor discourager 254 and the upstream stator discourager 256 encourage a smoother flow path for the mainstream gases 208 along the mainstream flow path 206 to discourage hot gas ingestion from flowing in a radial direction through the gap 250. Typically, the discouragers 254 and 256 are integral with the respective platform 234 and 272, although other arrangements may be provided.

Figure 3:
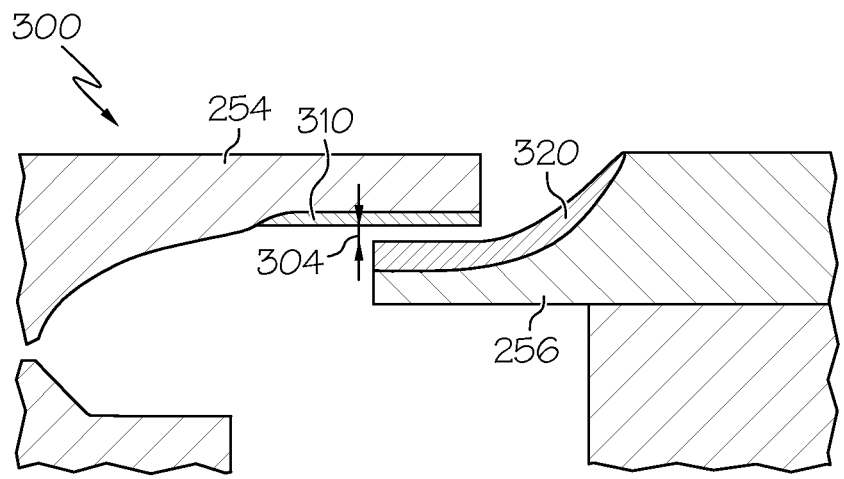
FIG. 3 is a partial, cross-sectional view of an aft seal assembly of the turbine section of FIG. 2 in a first condition in accordance with an exemplary embodiment.
Figure 4:
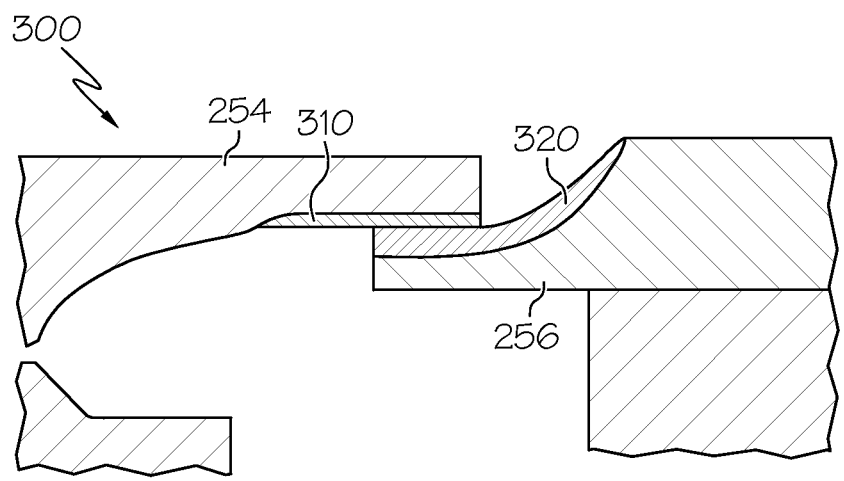
FIG. 4 is a partial, cross-sectional view of the aft seal assembly of FIG. 3 in a second condition in accordance with an exemplary embodiment.

FIGS. 3 and 4 are partial, cross-sectional views of the seal assembly 300 of the turbine section 200 of FIG. 2 respectively in a first condition and a second condition in accordance with an exemplary embodiment. Referring initially to FIG. 3, as introduced above, the seal assembly 300 may include the downstream rotor discourager 254 and the upstream stator discourager 256 that axially overlap one another. The axial overlap, in effect, creates a radial seal separated by a radial distance 304. It is generally advantageous to minimize the radial distance 304 between the discouragers 254 and 256 to minimize hot gas ingestion. However, as temperatures and operating conditions change, the locations of the discouragers 254 and 256 may vary, for example, due to thermal growth and contraction. As a result, the radial distance 304 may close and the discouragers 254 and 256 may contact one another, as is shown by the second condition in FIG. 4. Conventional discouragers may increase the radial distance to decrease the likelihood of contact. However, increasing the radial distance also increases the likelihood of hot gas ingestion.

In accordance with an exemplary embodiment, to address the contact issue during certain operating conditions (e.g., the second operating condition of FIG. 4) while still maintaining a minimized distance 304 between the discouragers 254 and 256 during normal operation (e.g., the first operating condition of FIG. 3), the seal assembly 300 may further include a hard coating 310 on the downstream rotor discourager 254 and an abradable coating 320 on the upstream stator discourager 256. During the second (or contact) condition, the abradable coating 320 and the hard coating 310 cooperate to prevent undue heating or warping of the downstream rotor discourager 254 or the upstream stator discourager 256. In general, the abradable coating 320 is designed to wear in a predictable and controllable manner relative to the hard coating 310 during contact. During contact, the hard coating 310 wears the abradable coating 320 to improve the concentricity of the turbine rotor discourager 254 with respect to the stator discourager 256. This enables a reduction in the average radial flow discourager gap 304, thus reducing the hot gas ingestion into the turbine disk cavity 252 or 242 and thus reducing the required cooling purge flow 258 or 248 to maintain acceptable turbine cavity air temperatures.

The hard coating 310 is applied to the radially inward facing side of the downstream rotor discourager 254. The hard coating 310 is of suitable composition to preclude any appreciable wear in the base substrate material of the downstream rotor discourager 254. In one exemplary embodiment, the hard coating 310 may be formed by grains of Cubic Boron Nitride (CBN) applied to the downstream rotor discourager 254 and suspended within a metal matrix for bonding the hard coating 310 to the downstream rotor discourager 254. However, any material that exhibits satisfactory wear resistance or hardness may be provided with any suitable bonding mechanism. In one embodiment, the hard coating 310 may comprise particles of CBN of characteristic length between 0.001 inches and 0.005 inches that are suspended in a metal matrix of NiCoCrAlY or NiCrAlY that is electroplated or plasma sprayed to a thickness of between 0.002 mils to 0.01 mils thick. Electroplating and plasma spray operations are commercially available from companies such as Praxair Surface Technologies, Inc., Indianapolis, Ind. In other embodiments, the size of the CBN particles and the thickness of the metal matrix may be larger or smaller than the above values. In still another embodiment, the hard coating 310 may comprise SiC or alumina suspended in a metal matrix. Generally, the hard coating 310 may be applied directly to the downstream rotor discourager 254 and no additional mounting techniques or components are required. Additionally, since no additional mounting components are necessary, the size and configuration of the disk cavity 252 does not need to be redesigned in a retrofit situation.

The abradable coating 320 is applied to the radially outward facing side of the upstream stator discourager 256. The abradable coating 320 may comprise any suitable coating that wears when subjected to contact with hard coating 310. In one exemplary embodiment, the abradable coating 320 may be a thermal barrier coating applied with Electron Beam Physical Vapor Deposition (EBPVD) or plasma spray. For example, the abradable coating 320 may be a 7% yttria-stabilized zirconia (YSZ) ceramic material used as a thermal barrier coating and applied as is commonly known to those skilled in the art. Such commercially available suppliers include Alcoa Howmet Thermatech Coatings (Whitehall, Mich.) and Honeywell International (Greer, S.C.). In one embodiment, the thickness of the abradable coating 320 may be from 2 to 10 mils over a length of from 50 to 200 mils. In other embodiments, the thickness and length of the applied thermal barrier abradable coating 320 may be larger or smaller than the above values. Generally, the abradable coating 320 may be applied directly to the upstream stator discourager 256 and no additional mounting techniques or components are required. In general, the abradable coating 320 provides a relatively smooth surface to prevent or mitigate flow losses as the mainstream gases 208 flows along the mainstream flow path 206. For example, the abradable coating 320 is typically not a baffle or honeycomb structure that would result in undue flow losses. The abradable coating 320 may additionally be a thermal barrier coating (TBC) that insulates the upstream stator discourager 256 from the mainstream gases 208. In such an embodiment, a TBC material may be modified to increase porosity or otherwise enhance the ability to predictably abrade. In the above mentioned embodiment, the hard coating 310 is applied to the rotor and the abradable coating 320 is applied to the stator to protect the turbine aft cavity 252.

Figure 5:
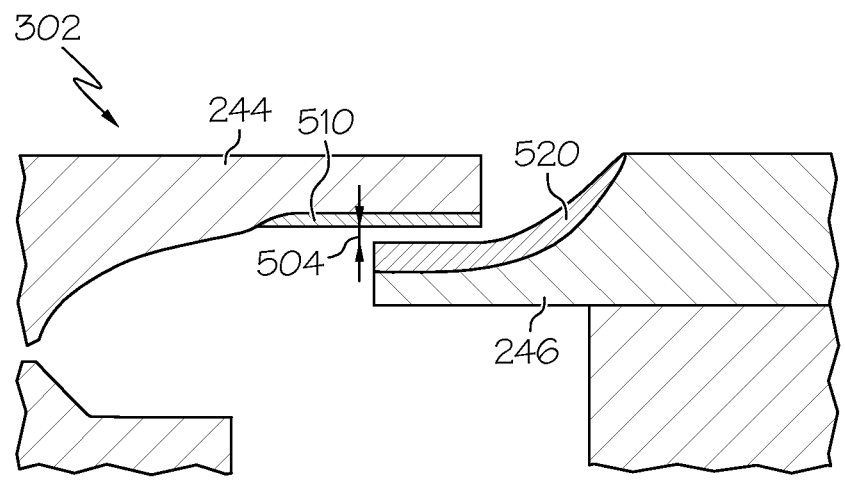
FIG. 5 is a partial, cross-sectional view of a forward seal assembly of the turbine section of FIG. 2 in a first condition in accordance with an exemplary embodiment.
Figure 6:
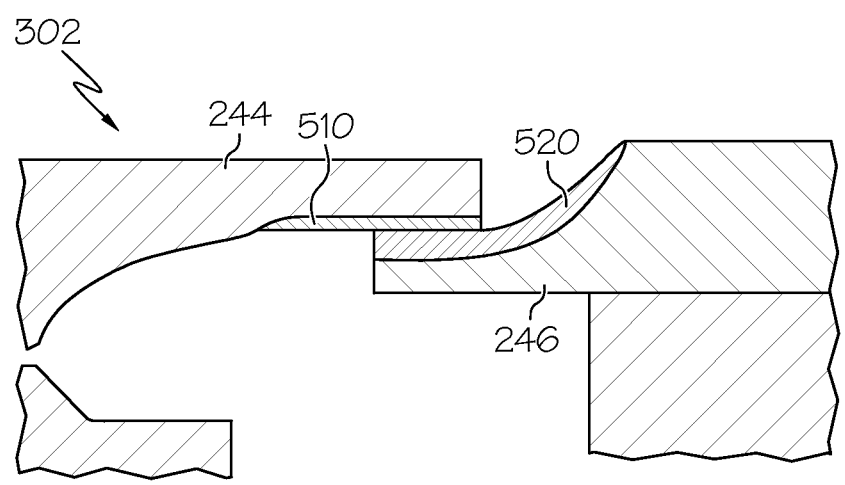
FIG. 6 is a partial, cross-sectional view of the forward seal assembly of FIG. 5 in a second condition in accordance with an exemplary embodiment.

FIGS. 5 and 6 are partial, cross-sectional views of the seal assembly 302 of the turbine section 200 of FIG. 2 respectively in a first condition and a second condition in accordance with an exemplary embodiment. Referring initially to FIG. 5, as introduced above, the seal assembly 302 may include the downstream stator discourager 244 and the upstream rotor discourager 246 that axially overlap one another. The axial overlap, in effect, creates a radial seal separated by a radial distance 504. As above, it is generally advantageous to minimize the radial distance 504 between the discouragers 244 and 246 to minimize hot gas ingestion while addressing any contact issues.

In accordance with an exemplary embodiment, to address the contact issue during certain operating conditions (e.g., the second operating condition of FIG. 6) while still maintaining a minimized distance 504 between the discouragers 244 and 246 during normal operation (e.g., the first operating condition of FIG. 5), the seal assembly 302 may further include a hard coating 510 on the downstream stator discourager 244 and an abradable coating 520 on the upstream rotor discourager 246. During the second (or contact) condition, the abradable coating 520 and the hard coating 510 cooperate to prevent undue heating or warping of the downstream stator discourager 244 or the upstream rotor discourager 246. In general, the abradable coating 520 is designed to wear in a predictable and controllable manner relative to the hard coating 510 during contact, as described above.

The hard coating 510 is applied to the radially inward facing side of the downstream stator discourager 244, and the abradable coating 520 is applied to the radially outward facing side of the upstream rotor discourager 246. The content, material, and function of the hard coating 510 and abradable coating 520 may correspond that of the hard coating 310 and abradable coating 320 discussed above.

Accordingly, the seal assemblies 300 and 302 particularly prevent or inhibit hot gas ingestion at gaps 240 and 250, thereby reducing or eliminating the need for purge air 248 and 258 and increasing the efficiency of the turbine section 200. CFD analyses may be used to define the sizes and shapes of the discouragers 244, 246, 254, and 256 and sizes and shapes of the coatings 310, 320, 510, and 520 to produce an optimal ingestion inhibiting configuration. Exemplary arrangements may vary with application, engine design, and dimensions. The hard coating 310 and 510 and abradable coating 320 and 520 also reduce issues with tolerances during the casting, forging, and/or machining processes during fabrication, installation, or repairing the turbine section 200.

Exemplary embodiments effectively minimize or prevent undesirable high temperature exposure of engine components mounted internal to the mainstream hot flow path, such as the rotor disks, thereby achieving substantially improved overall temperature control. Additionally, because of the simplicity of the design, the systems and methods disclosed herein can be readily incorporated on new design engines or it can be economically retrofitted on existing engines. Application of these exemplary embodiments may reduce turbine disk cavity cooling flows by 0.5%, thus improving specific fuel consumption by 0.5%. Exemplary embodiments discussed herein may enable higher turbine engine temperatures than conventional engines, which may result in an improvement in specific fuel consumption. Alternatively, exemplary embodiments may improve durability at current temperatures. In general, the gas turbine engine assemblies produced according to exemplary embodiments may find beneficial use in many industries including aerospace, but also including industrial applications such as electricity generation, naval propulsion, pumping sets for gas and oil transmission, aircraft and/or spacecraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A turbine section of a gas turbine engine, comprising:
 a housing including an annular duct wall that at least partially defines a mainstream hot gas flow path configured to receive mainstream hot gas flow;
 a rotor assembly including a rotor disk, a rotor platform coupled to the rotor disk, and a rotor blade extending from the rotor platform into the mainstream hot gas flow path;
 a first stator assembly positioned adjacent to the rotor assembly on a downstream side and forming a first turbine disk cavity with the rotor disk of the rotor assembly, the first stator assembly including a first stator platform with a first stator vane that extends from the first stator platform into the mainstream hot gas flow path;
 a second stator assembly positioned adjacent to the rotor assembly on an upstream side and forming a second turbine disk cavity with the rotor disk of the rotor assembly, the second stator assembly including a second stator platform with a second stator vane that extends from the second stator platform into the mainstream hot gas flow path; and a seal assembly comprising
a first flow discourager extending in a downstream direction from the rotor platform,
a second flow discourager extending in an upstream direction from the first stator platform, the first flow discourager axially overlapping the second flow discourager such that the second flow discourager is interior to the first flow discourager in a radial direction,
a first hard coating applied to the first flow discourager,
a first abradable coating applied to the second flow discourager,
a third flow discourager extending in the upstream direction from the rotor platform,
a fourth flow discourager extending in the downstream direction from the second stator platform, the fourth flow discourager axially overlapping the third flow discourager such that the third flow discourager is interior to the fourth flow discourager in the radial direction,
a second hard coating applied to the fourth flow discourager, and
a second abradable coating applied to the third flow discourager.

2. The turbine section of claim 1, wherein the first flow discourager has a radially outward facing side and a radially inward facing side, the first hard coating being applied on the radially inward facing side of the first flow discourager.

3. The turbine section of claim 1, wherein the second flow discourager has a radially outward facing side and a radially inward facing side, the first abradable coating being applied on the radially outward facing side of the second flow discourager.

4. The turbine section of claim 1, wherein the first hard coating and the first abradable coating are configured to maintain a running clearance during a first operating condition and to contact one another during a second operating condition, and wherein the first hard coating is configured to abrade the first abradable coating during the second operating condition.

5. The turbine section of claim 1, wherein the first and second hard coatings include Cubic Boron Nitride (CBN).

6. The turbine section of claim 5, wherein the CBN is a spray or plated coating.

7. The turbine section of claim 1, wherein the first and second abradable coatings are a thermal barrier coating (TBC).

8. The turbine section of claim 1, wherein the first and second abradable coatings are a ceramic material.

9. The turbine section of claim 8, wherein each of the first and second abradable coatings is an Electron Beam Physical Vapor Deposition (EBPVD) coating or a plasma spray coating.

10. A seal assembly for a turbine section of a gas turbine engine, the turbine section including first and second stator assemblies such that the first stator assembly has a first stator platform and the second stator assembly has a second stator platform and a rotor assembly with a rotor platform, the seal assembly comprising:
a first flow discourager extending in a downstream direction from the rotor platform;
a second flow discourager extending in an upstream direction from the first stator platform, the first flow discourager axially overlapping the second flow discourager such that the second flow discourager is interior to the first flow discourager in a radial direction;
a first hard coating applied to the first flow discourager;
a first abradable coating applied to the second flow discourager;
a third flow discourager extending in the upstream direction from the rotor platform;
a fourth flow discourager extending in the downstream direction from the second stator platform, the fourth flow discourager axially overlapping the third flow discourager such that the third flow discourager is interior to the fourth flow discourager in the radial direction;
a second hard coating applied to the fourth flow discourager; and
a second abradable coating applied to the third flow discourager.

11. The seal assembly of claim 10, wherein the first flow discourager has a radially outward facing side and a radially inward facing side, the first hard coating being applied on the radially inward facing side of the first flow discourager.

12. The seal assembly of claim 10, wherein the second flow discourager has a radially outward facing side and a radially inward facing side, the first abradable coating being applied on the radially outward facing side of the second flow discourager.

13. The seal assembly of claim 10, wherein the first hard coating and the first abradable coating are configured to maintain a running clearance during a first operating condition and to contact one another during a second operating condition, and wherein the first hard coating is configured to abrade the first abradable coating during the second operating condition.

14. The seal assembly of claim 10, wherein the first and second hard coatings include Cubic Boron Nitride (CBN).

15. The seal assembly of claim 14, wherein the CBN is a spray or plated coating.

16. The seal assembly of claim 10, wherein the first and second abradable coatings are a thermal barrier coating (TBC).

17. The seal assembly of claim 10, wherein each of the first and second abradable coatings is a ceramic material applied as an Electron Beam Physical Vapor Deposition (EBPVD) coating or a plasma spray coating.

18. A method for sealing a turbine section against hot gas ingestion during operation between a rotor assembly with a rotor platform and stator assemblies with first and second stator platforms, the method comprising the steps of:
applying a first hard coating to a radially inward facing side of a first flow discourager extending in a downstream direction from the rotor platform; and
applying a second abradable coating to a radially outward facing side of a second flow discourager extending in an upstream direction from the first stator platform, the first flow discourager axially overlapping the second flow discourager such that the second flow discourager is interior to the first flow discourager in a radial direction;
applying a second abradable coating to a radially outward facing side of a third flow discourager extending in the upstream direction from the rotor platform; and
applying a second hard coating to a radially inward facing side of a fourth flow discourager extending in the downstream direction from the second stator platform, the fourth flow discourager axially overlapping the third flow discourager such that the third flow discourager is interior to the fourth flow discourager in the radial direction.

* * * * *